United States Patent
Sawada et al.

(10) Patent No.: US 7,113,863 B2
(45) Date of Patent: Sep. 26, 2006

(54) INTERNAL COMBUSTION ENGINE CONTROL SYSTEM

(75) Inventors: Mamoru Sawada, Yokkaichi (JP); Toshiki Matsumoto, Kariya (JP); Keiichi Kawakami, Anjo (JP)

(73) Assignee: Denso Corporation, Kariya (JP)

( * ) Notice: Subject to any disclaimer, the term of this patent is extended or adjusted under 35 U.S.C. 154(b) by 13 days.

(21) Appl. No.: 10/959,418

(22) Filed: Oct. 7, 2004

(65) Prior Publication Data
US 2005/0119820 A1 Jun. 2, 2005

(30) Foreign Application Priority Data
Oct. 7, 2003 (JP) ............................ 2003-348444

(51) Int. Cl.
*F02D 41/04* (2006.01)
(52) U.S. Cl. .................................. 701/111; 123/192.1
(58) Field of Classification Search ............. 123/192.1, 123/327, 493; 701/111
See application file for complete search history.

(56) References Cited

U.S. PATENT DOCUMENTS
5,896,839 A * 4/1999 Togai ......................... 123/295

FOREIGN PATENT DOCUMENTS
JP          A-54-159526         12/1979
JP          63106345 A    *      5/1988

\* cited by examiner

*Primary Examiner*—Stephen K. Cronin
*Assistant Examiner*—Hyder Ali
(74) *Attorney, Agent, or Firm*—Posz Law Group, PLC (57) ABSTRACT

A vehicle-supervising electronic control unit (VS-ECU) measures driving torque, which is outputted from an engine to a drive shaft through an automatic transmission. The VS-ECU measures road surface transmission torque based on rotation speeds of driving wheels of a vehicle, vehicle body speed and driving wheel torque, which are measured in advance. The VS-ECU compares the driving torque with the road surface transmission torque. If it is determined that the driving torque is greater than the road surface transmission torque, the VS-ECU estimates an opening degree of an air bypass valve for controlling the driving torque so that a difference between the driving torque and the road surface transmission torque is decreased.

30 Claims, 6 Drawing Sheets

INTERNAL COMBUSTION ENGINE CONTROL SYSTEM

CROSS REFERENCE TO RELATED APPLICATION

This application is based on and incorporates herein by reference Japanese Patent Application No. 2003-348444 filed on Oct. 7, 2003.

BACKGROUND OF THE INVENTION

1. Field of the Invention

The present invention relates to a control system for controlling an operating state of an internal combustion engine.

2. Description of Related Art

In known structure of an internal combustion engine of a vehicle, an air bypass passage is formed so that the air bypass passage bypasses a throttle valve disposed in an intake passage of the engine, and an air bypass valve is disposed in the air bypass passage for regulating a flow rate of air passing through the air bypass passage.

Usually, the above structure is used to stabilize an operating state of the internal combustion engine. A control system disclosed in Unexamined Japanese Patent Application Publication No. S54-159526 increases an opening degree of the air bypass valve when a load applied to the engine increases, for instance, when an air conditioner of a vehicle is operated. Thus, control for stabilizing the operating state of the engine is performed.

The above control system regulates the opening degree of the air bypass valve only for the purpose of stabilizing the operating state of the engine. However, in this case, there is a possibility that driving torque outputted from the engine to a drive shaft through a transmission is fluctuated by the regulation of the opening degree, and vibration of a vehicle body is increased by the fluctuation of the driving torque. The vibration of the vehicle body means vibration of a system (a vehicle body system, a sprung mass) mounted on a vibration system (an unsprung mass) such as driving wheels or driven wheels of the vehicle through suspension springs.

SUMMARY OF THE INVENTION

It is therefore an object of the present invention to provide a technology for suitably inhibiting vibration of a vehicle body by controlling an air bypass valve.

According to an aspect of the present invention, a control system of an internal combustion engine of a vehicle controls an operating state of the engine by controlling an air bypass valve, which is disposed in an air bypass passage for regulating a flow rate of air passing through the air bypass passage. The air bypass passage is formed in an intake passage so that the air bypass passage bypasses a throttle valve disposed in the intake passage.

Vibration estimating means estimates a state of vibration of a vehicle body. Vibration inhibition opening degree estimating means estimates an opening degree of the air bypass valve necessary to inhibit the vibration of the vehicle body based on the estimated state of the vehicle body vibration.

Thus, the vehicle body vibration can be suitably inhibited by controlling the air bypass valve in accordance with the estimated opening degree of the air bypass valve.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS

First Embodiment

Figure 1:
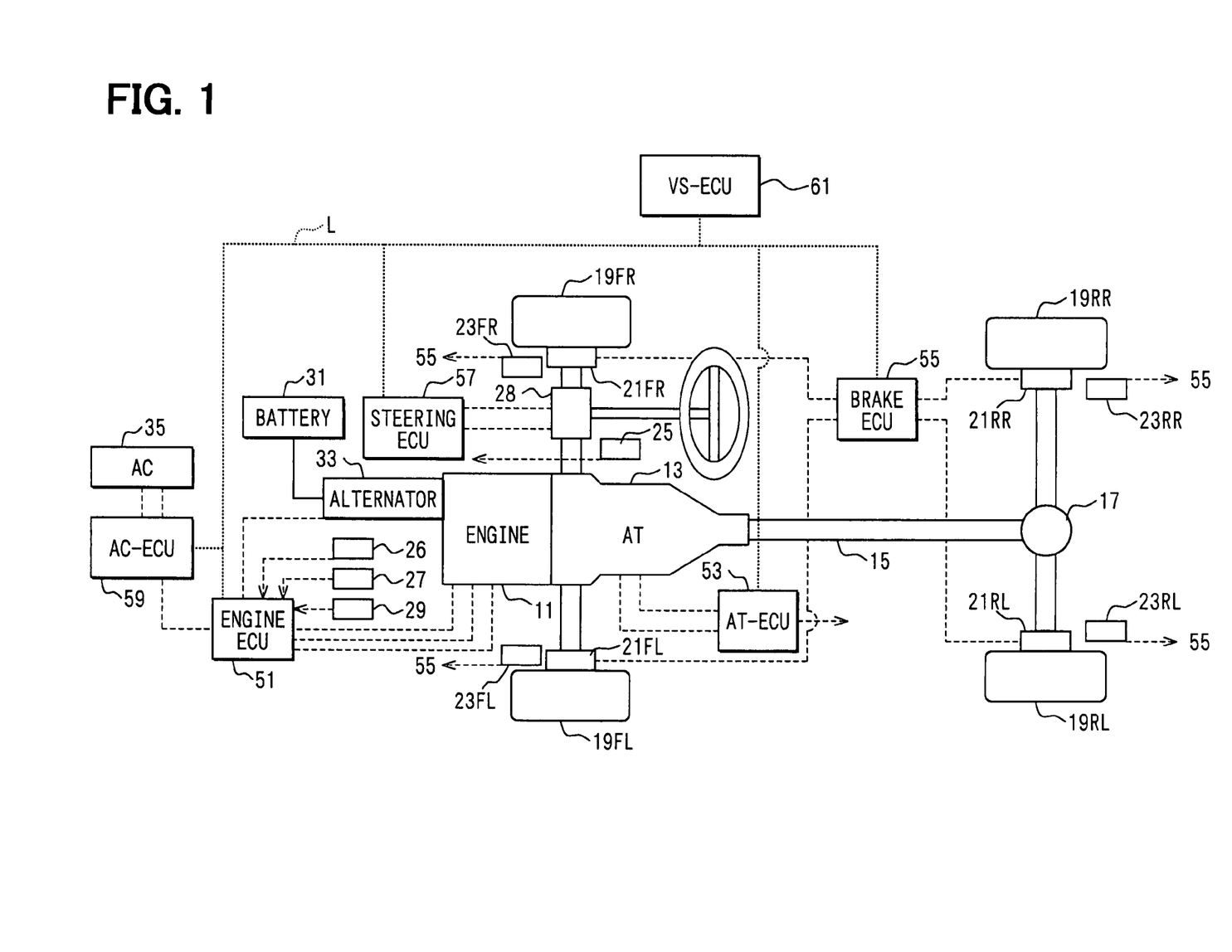
FIG. 1 is a block diagram showing a control system of an internal combustion engine of a vehicle according to a first embodiment of the present invention.

Referring to FIG. 1, structure of a control system of an internal combustion engine according to a first embodiment of the present invention is illustrated. As shown in FIG. 1, the control system of the present embodiment is applied to a front engine rear drive vehicle.

In the vehicle shown in FIG. 1, output torque outputted from an engine (an internal combustion engine) 11 is transmitted to a drive shaft 15 as driving torque through an automatic transmission (a multiple-speed transmission, an AT) 13. The driving torque transmitted to the drive shaft 15 is distributed to rear wheels (driving wheels) (a left rear wheel 19RL and a right rear wheel 19RR) through a differential gear 17 such as a limited slip differential (an LSD).

Hydraulic brake devices 21FL, 21FR, 21RL, 21RR are mounted to respective wheels (a left front wheel 19FL and a right front wheel 19FR as driven wheels and the left rear wheel 19RL and the right rear wheel 19RR as the driving wheels). The brake devices 21FL–21RR apply braking forces to the respective wheels 19FL–19RR.

The brake devices 21FL-21RR are driven based on control signals outputted from a brake electronic control unit (a brake ECU) 55 corresponding to manipulation of a brake pedal performed by a vehicle driver.

As shown in FIG. 1, wheel speed sensors 23FL, 23FR, 23RL, 23RR are mounted to the respective wheels 19FL–19RR for sensing rotation speeds of the respective wheels 19FL–19RR.

The vehicle has an engine ECU 51, an AT-ECU 53, and the brake ECU 55 for respectively controlling the engine 11, the AT 13 and the brake devices 21FL-21RR. The vehicle also has a steering ECU 57 for outputting control signals for changing a steering angle to an actuator 28, which changes the steering angle of the driven wheels 19FL, 19FR (the front wheels) based on the steering angle provided through an operation performed by the vehicle driver. The steering angle is sensed by a steering angle sensor 25. The vehicle also has an AC-ECU 59 for controlling an operation of an air conditioner 35 of the vehicle.

The AT-ECU 53 receives sensor signals from a shift position switch, which senses a manipulated position (a shift position) of a shift lever manipulated by the vehicle driver. The brake ECU 55 receives sensor signals from a master cylinder pressure sensor and the wheel speed sensors 23FL–23RR. The master cylinder pressure sensor senses an oil pressure in a master cylinder, which pressure-feeds a brake fluid in accordance with manipulation of the brake pedal performed by the vehicle driver.

Next, functions of the engine ECU 51 will be explained based on FIGS. 1 and 2.

Figure 2:
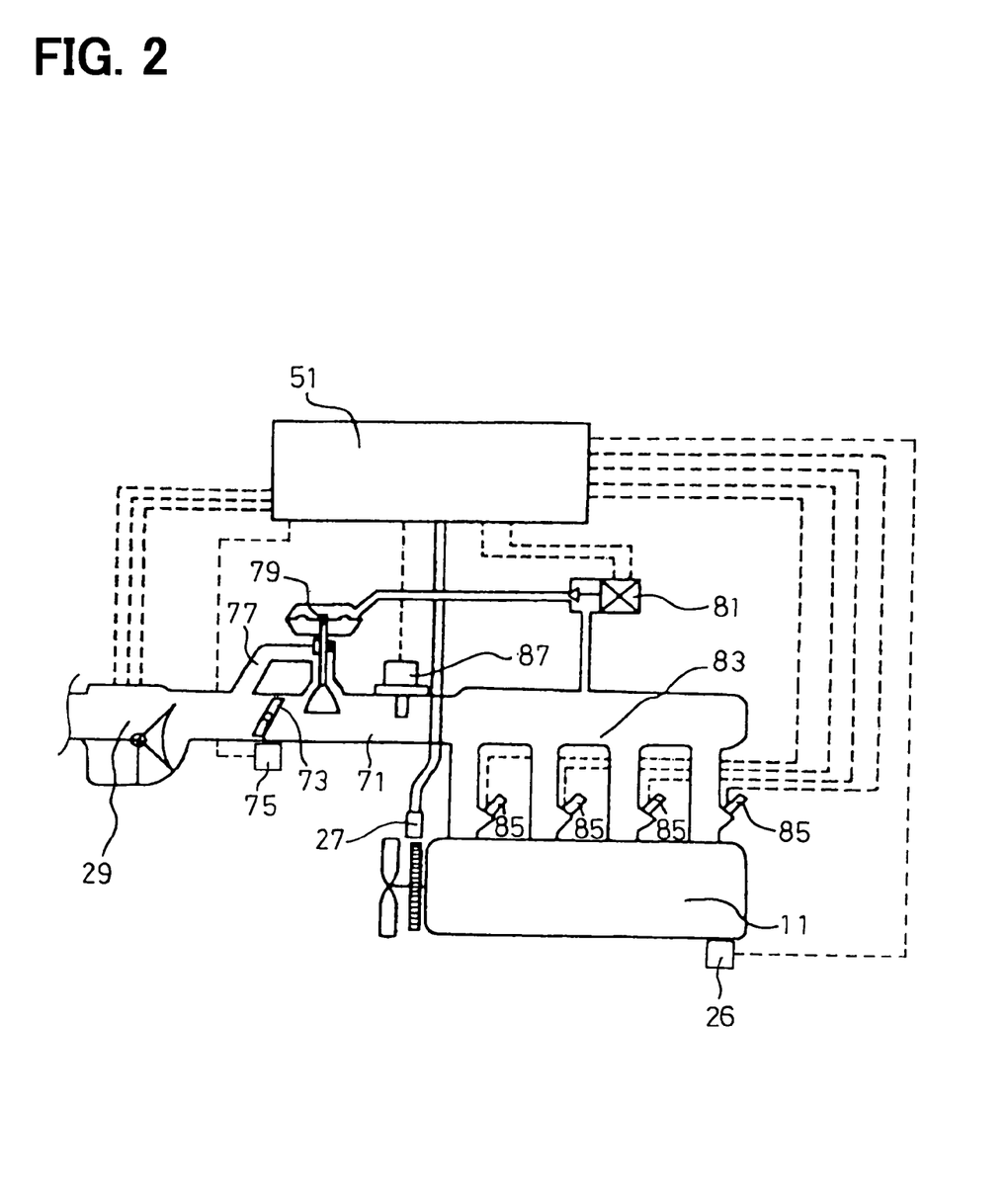
FIG. 2 is a block diagram showing relationships between an engine ECU and various components of the vehicle according to the first embodiment.

As shown in FIG. 2, when the engine 11 is in a driving state, intake air passes through an air flow meter (an intake air quantity sensor) 29, which senses a flow rate of the air taken into the engine 11, and a throttle valve 73 disposed in an intake passage 71. Then, the intake air is distributed to respective cylinders through an intake manifold 83.

The intake passage 71 has an air bypass passage 77. The air bypass passage 77 bypasses the throttle valve 73 and connects a part of the intake passage 71 upstream of the throttle valve 73 with another part of the intake passage 71 downstream of the throttle valve 73. An air bypass valve 79 is disposed in the air bypass passage 77. The air bypass valve 79 regulates a flow rate of the intake air passing through the air bypass passage 77. When the air bypass valve 79 is open, the intake air also passes through the air bypass passage 77 and reaches the intake manifold 83.

Actuators 75, 81 drive the throttle valve 73 and the air bypass valve 79 respectively. The air bypass valve 79 can be driven by a variety of actuators. For instance, the air bypass valve 79 may be driven by an actuator, which is driven by a negative pressure introduced from the intake manifold 83. In this case, an electromagnetic valve (an actuator) 81 is disposed in a pipe, which introduces the negative pressure from the intake manifold 83 to the air bypass valve 79 as shown in FIG. 2. A valve opening period of the electromagnetic valve 81 is regulated to quantitatively control the negative pressure as the driving force of the air bypass valve 79. Thus, the opening degree of the air bypass valve 79 can be regulated.

The engine ECU 51 outputs control signals to the actuators 75, 81 to control the opening degrees of the throttle valve 73 and the air bypass valve 79 as shown in FIG. 2. The engine ECU 51 outputs a control signal to an alternator 33 to control an operating state of the alternator 33 as shown in FIG. 1. The alternator 33 charges an in-vehicle battery 31 with the use of part of the output torque of the engine 11 as shown in FIG. 1.

Moreover, the engine ECU 51 receives sensor signals from a cooling fluid temperature sensor 26 for sensing temperature of cooling fluid of the engine 11, an engine rotation speed sensor 27 for sensing rotation speed of the engine 11, and the air flow meter 29 as shown in FIGS. 1 and 2.

As shown in FIG. 1, the vehicle further includes a vehicle-supervising ECU (a VS-ECU) 61, which outputs operation guide information to the engine ECU 51, the AT-ECU 53, the brake ECU 55, the steering ECU 57 and the AC-ECU 59.

The VS-ECU 61 produces the operation guide information for respective components of the vehicle based on respective data including the sensed values (explained above), which are inputted from the ECUs 51, 53, 55, 57, 59 to the VS-ECU 61 through signal lines L for specifying the operating state of the vehicle. The signal lines L connect the ECUs 51, 53, 55, 57, 59, 61 with each other. Then, the VS-ECU 61 outputs the operation guide information to the respective ECUs 51, 53, 55, 57, 59. Thus, optimum control of the entire vehicle is realized.

Each one of the ECUs 51, 53, 55, 57, 59, 61 is structured as an electronic control device centering on a microcomputer, and includes CPU, ROM and RAM.

Next, control processing performed by the respective ECUs 51, 53, 55, 57, 59, 61 will be explained based on FIG. 3.

Figure 3:
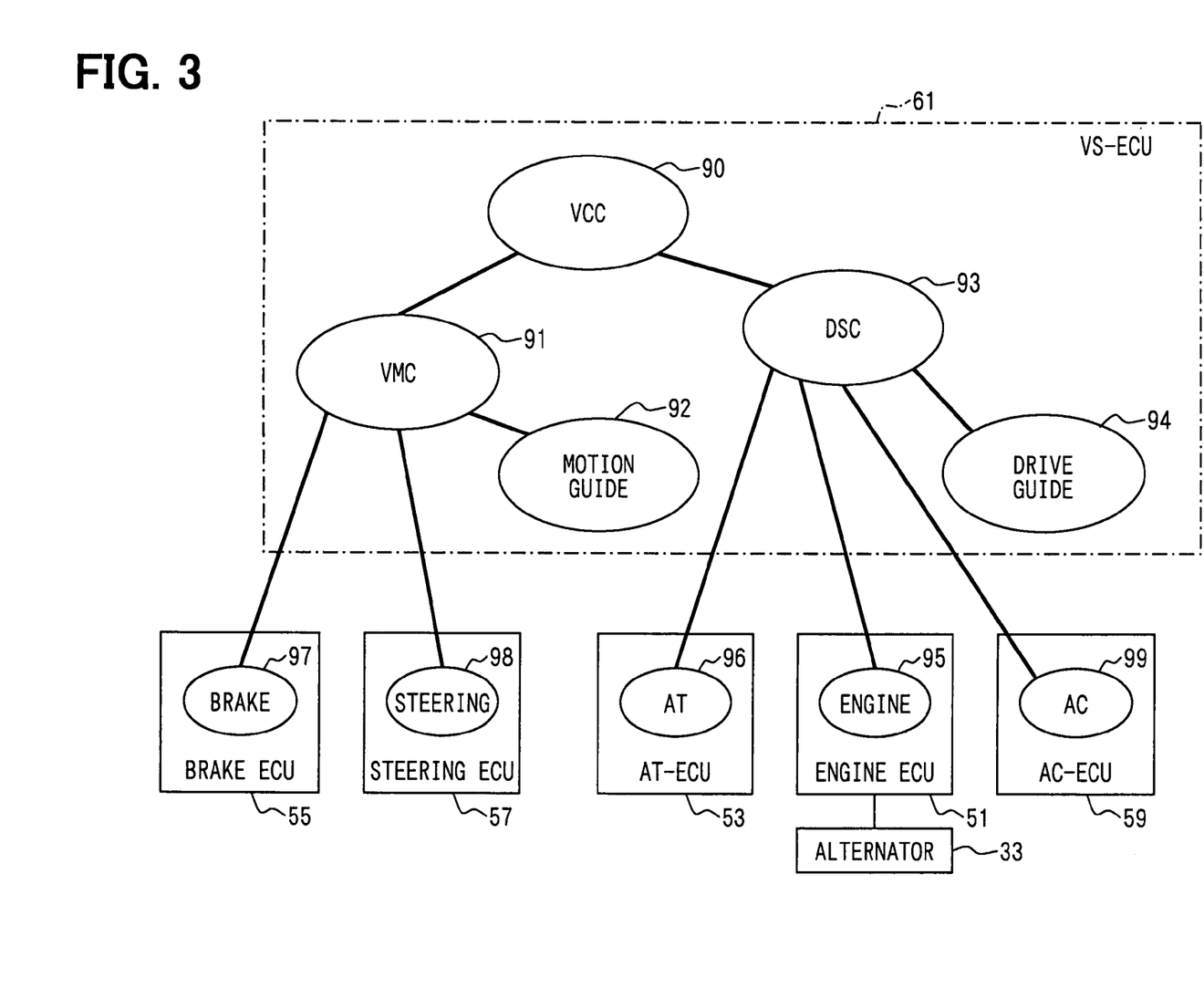
FIG. 3 is a functional block diagram showing control processing performed by respective ECUs of the control system according to the first embodiment.

As shown in FIG. 3, a vehicle control coordinator (VCC) 90, a vehicle motion coordinator (VMC) 91, a motion system operation guide production section (a motion guide) 92, a drive system coordinator (DSC) 93 and a drive system operation guide production section (a drive guide) 94 are mounted on the VS-ECU 61. An engine control component 95, an AT control component 96, a brake control component 97, a steering control component 98, and an AC control component 99 for respectively controlling the operation of the engine 11, the AT 13, the brake devices 21FL–21RR, the actuator 28 and the air conditioner 35 are mounted on the ECUs 51, 53, 55, 57, 59 respectively.

In this structure, information sensed by the respective components 95–99 for controlling the vehicle is inputted to the VS-ECU 61, and is shared by the respective components of the VS-ECU 61 requiring the information.

The information for controlling the vehicle is outputted from the respective components and is inputted to the VS-ECU 61 as follows.

First, the engine control component 95 calculates the engine cooling fluid temperature, the engine rotation speed and the intake air flow rate based on the sensor signals outputted from the cooling fluid temperature sensor 26, the engine rotation speed sensor 27 and the air flow meter 29. The engine control component 95 receives operation state information (opening degree information) of the throttle valve 73 and the air bypass valve 79 from the actuators 75, 81. Meanwhile, the engine control component 95 receives the information indicating the operating state of the alternator 33 from the alternator 33. The engine control component 95 outputs the calculated or inputted information (the engine cooling fluid temperature, the engine rotation speed, the intake air flow rate, and operation state information of the throttle valve 73, the air bypass valve 79 and the alternator 33) to the VS-ECU 61. The AT control component 96 calculates a change gear ratio of the AT 13 based on the sensor signals outputted from the shift position switch, and outputs the change gear ratio to the VS-ECU 61. The brake control component 97 measures the wheel rotation speeds of the respective wheels 19FL–19RR based on the sensor signals outputted from the wheel speed sensors 23FL–23RR, and outputs the wheel rotation speeds to the VS-ECU 61. The AC control component 99 receives information indicating the operating state of the air conditioner 35, and outputs the information to the VS-ECU 61.

In the VS-ECU 61, the vehicle control coordinator (VCC) 90 receives the information from the respective components 95–99 and performs cooperative control between the vehicle motion coordinator (VMC) 91 and the drive system coordinator (DSC) 93. Responsive to a command of the vehicle control coordinator (VCC) 90, the vehicle motion coordinator (VMC) 91 outputs the operation guide information to the brake control component 97 and the steering control component 98 connected with the vehicle motion coordinator (VMC) 91. The outputted operation guide information is produced by the motion system operation guide production section 92 responsive to the command of the vehicle control coordinator (VCC) 90. Likewise, responsive to the command of the vehicle control coordinator (VCC) 90, the drive system coordinator (DSC) 93 outputs the operation guide information to the engine control component 95, the AT control component 96 and the AC control component 99 connected with the drive system coordinator (DSC) 93. The outputted operation guide information is produced by the drive system operation guide production section 94 responsive to the command of the vehicle control coordinator (VCC) 90. Receiving the operation guide information, the respective components 95–99 control objects to be controlled in accordance with the operation guide information.

Next, valve control processing will be explained in detail based on FIGS. 4 and 5. The valve control processing shown in FIGS. 4 and 5 is one of control processing repeatedly performed by the CPU as a component of the VS-ECU 61 during the travel of the vehicle based on the programs stored in the ROM of the VS-ECU 61.

Figure 4:
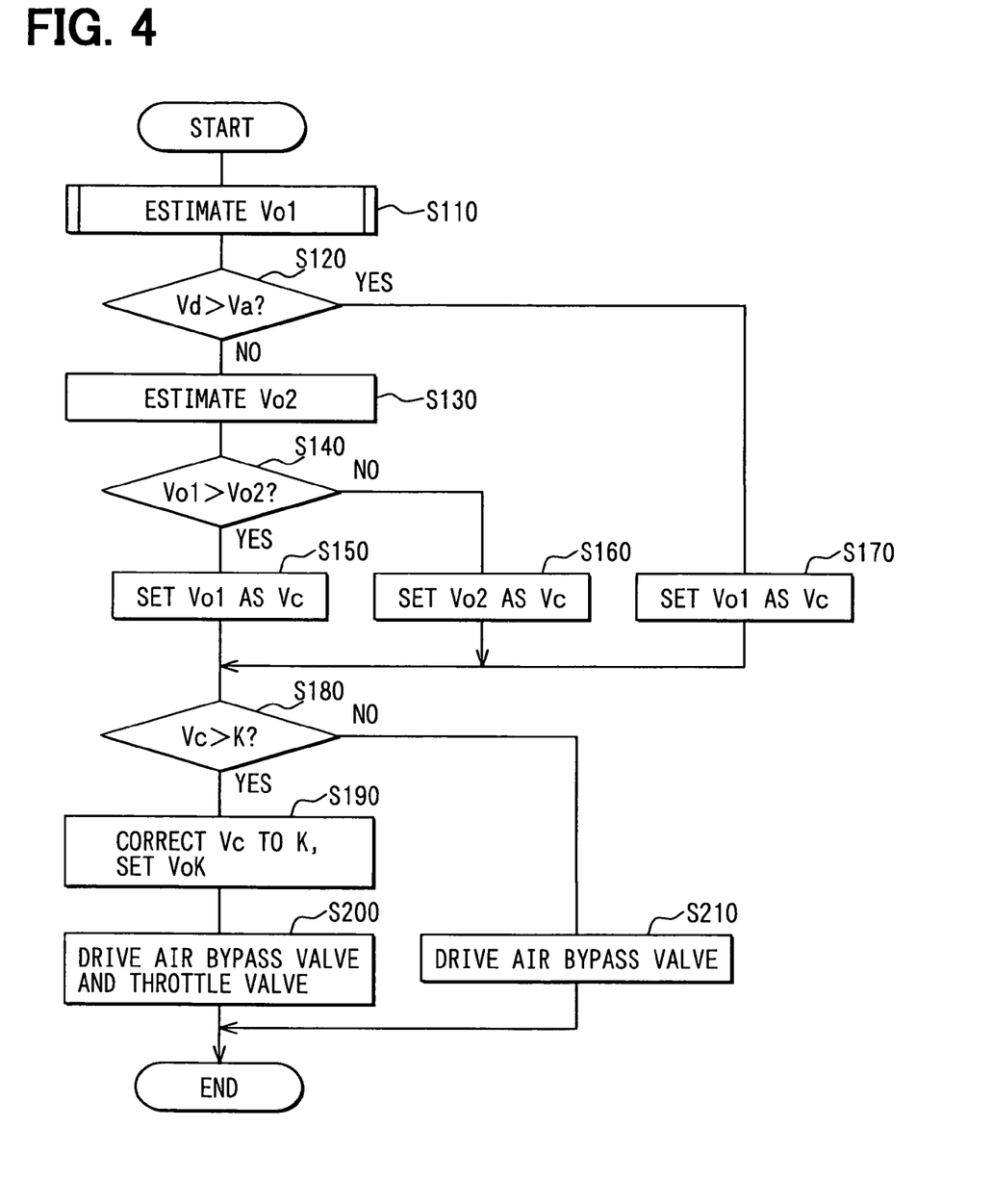
FIG. 4 is a flowchart showing valve control processing performed by a vehicle-supervising ECU according to the first embodiment.

As shown in FIG. 4, if the valve control processing is started, air bypass valve control amount determination processing for reducing vibration of a vehicle body is performed in Step S110. More specifically, in Step S110, a present state of the vibration of the vehicle body is estimated, and the opening degree Vo1 of the air bypass valve 79 is estimated based on the estimated state of the vehicle body vibration as shown in a flowchart of FIG. 5.

Figure 5:
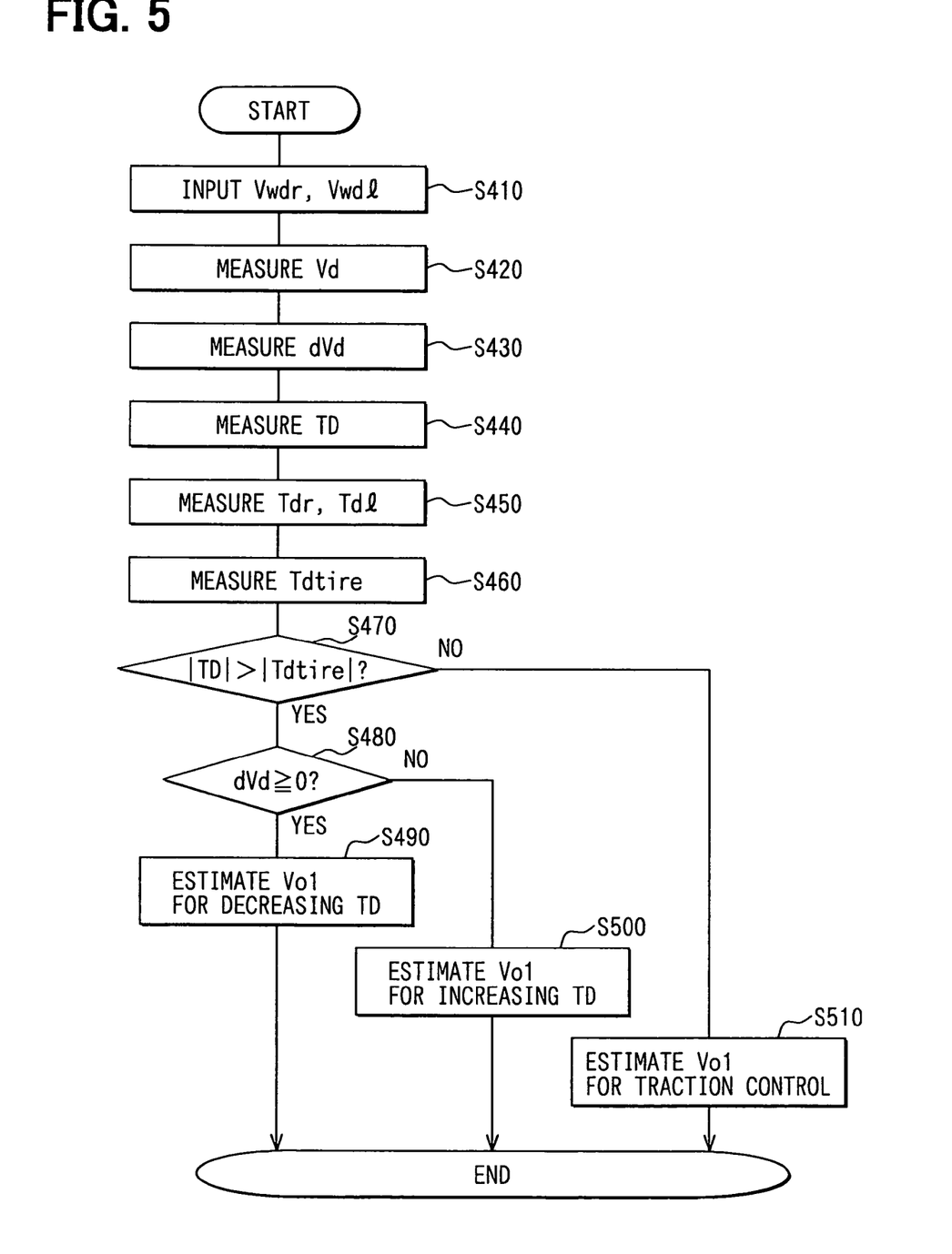
FIG. 5 is a flowchart showing air bypass valve control amount determination processing performed by the vehicle-supervising ECU according to the first embodiment.

In the determination processing of Step S110 of FIG. 4, a rotation speed Vwdr of the right driving wheel 19RR and a rotation speed Vwdl of the left driving wheel 19RL are inputted from the brake ECU 55 (the brake control component 97) in Step S410 of the flowchart shown in FIG. 5.

Then, in Step S420, a vehicle body speed Vd as a traveling speed of the vehicle is measured. For instance, a rotation speed Vwsr of the right driven wheel 19FR and a rotation speed Vwsl of the left driven wheel 19FL are inputted from the brake ECU 55 (the brake control component 97), and an average of the rotation speeds Vwsr, Vwsl is calculated as the vehicle body speed Vd.

Then, in Step S430, vehicle body acceleration dVd (acceleration of the vehicle body) is measured by differentiating the vehicle body speed Vd measured in Step S420.

Then, in Step S440, the driving torque TD outputted from the engine 11 to the drive shaft 15 through the AT 13 is measured as follows.

First, the engine rotation speed and the flow rate of the air taken into the engine 11 are inputted from the engine ECU 5.1 (the engine control component 95).

Then, based on the inputted engine rotation speed and the intake air flow rate, the output torque of the engine (the engine output torque, or the torque inputted from the engine 11 to an input shaft of the AT 13) is calculated. This calculation may be performed based on map data, which are stored in the ROM of the VS-ECU 61 in advance and indicate the relationship among the engine rotation speed, the intake air flow rate and the engine output torque.

Then, the change gear ratio of the AT 13 is inputted from the AT-ECU 53 (the AT control component 96). Then, the driving torque TD is obtained by multiplying the engine output torque by the change gear ratio.

Then, in Step S450, right driving wheel torque Tdr outputted from the right driving wheel 19RR and left driving wheel torque Tdl outputted from the left driving wheel 19RL are calculated based on the driving torque TD. The right driving wheel torque Tdr and the left driving wheel torque Tdl are respectively calculated by multiplying the driving torque TD obtained in Step S440 by predetermined mechanical losses corresponding to a behavior of the differential gear 17.

Then, in Step S460, road surface transmission torque Tdtire transmitted from the driving wheels 19RL, 19RR to the road surface in accordance with the right driving wheel torque Tdr and the left driving wheel torque Tdl is measured. The road surface transmission torque Tdtire is calculated from the rotation speeds Vwdr, Vwdl of the driving wheels 19RR, 19RL obtained in Step S410, the vehicle body speed Vd obtained in Step S420 and the right driving wheel torque Tdr and the left driving wheel torque Tdl obtained in Step S450, based on a following equation (1).

$$T\text{dtire}=(Tdr \cdot Vwdr + Tdl \cdot Vwdl)/Vd, \quad (1)$$

Then, in Step S470, the driving torque TD obtained in Step S440 is compared with the road surface transmission torque Tdtire obtained in Step S460. More specifically, it is determined whether an absolute value of the driving torque TD is greater than an absolute value of the road surface transmission torque Tdtire.

If the result of the determination in Step S470 is "YES", the processing proceeds to Step S480. If the result of the determination in Step S470 is "NO", the processing proceeds to Step S510.

In the case where the result of the determination in Step S470 is "YES", the processing may proceed to Step S480 after a torque difference $\Delta Ta$ ($\Delta Ta=TD-T\text{dtire}$) between the driving torque TD and the road surface transmission torque Tdtire is calculated in Step S470. The torque difference $\Delta Ta$ may be calculated in Step S490 or Step S500.

The vibrating state of the vehicle body can be suitably estimated by comparing the driving torque TD with the road surface transmission torque Tdtire for following reasons.

Part of the energy outputted from the engine 11 to the drive shaft 15 through the AT 13 is consumed in travel of the vehicle (motion of the unsprung mass, or translational motion). The other part of the energy is consumed in the vibration of the vehicle body system of the vehicle (the motion of the sprung mass) and the like.

Therefore, it is estimated that the energy consumed in the vibration of the vehicle body system corresponds to the torque difference $\Delta Ta$ between the driving torque TD, which corresponds to the energy outputted from the engine 11 to the drive shaft 15 through the AT 13, and the road surface transmission torque Tdtire, which corresponds to the energy consumed in the travel of the vehicle.

Therefore, if it is determined that the absolute value of the driving torque TD is greater than the absolute value of the road surface transmission torque Tdtire in Step S470, it can be estimated that the vibration of the vehicle body (the motion of the sprung mass) occurs.

Specifically, in the case where the torque difference $\Delta Ta$ between the driving torque TD and the road surface transmission torque Tdtire is calculated when the result of the determination in Step S470 is "YES", the degree of the vibration of the vehicle body (the motion of the sprung mass) can be evaluated quantitatively. It is because the torque difference $\Delta Ta$ corresponds to the energy consumed in the vibration of the vehicle body (the motion of the sprung mass).

As explained above, the energy corresponding to the driving torque TD outputted from the engine 11 to the drive shaft 15 through the AT 13 is partly consumed in the travel of the vehicle (the motion of the unsprung mass), and the other part of the energy corresponds to the road surface transmission torque Tdtire. Therefore, theoretically, the absolute value of the driving torque TD cannot become less than the absolute value of the road surface transmission torque Tdtire.

However, actually, there is a possibility that the absolute value of the driving torque TD becomes less than the absolute value of the road surface transmission torque Tdtire because of an error in the measurement. In the present embodiment, the above phenomenon can be caused when wheel spin of the driving wheels 19RR, 19RL occurs. In this case, very high rotation speeds Vwdr, Vwdl of the driving wheels 19RR, 19RL, which do not correspond to the vehicle body speed Vd measured in Step S420, are measured in Step S410 because of the wheel spin. As a result, the road surface transmission torque Tdtire greater than the actual road surface transmission torque is measured based on the equation (1).

Therefore, in the present embodiment, the opening degree Vo1 of the air bypass valve 79 is estimated based on the torque difference ΔTa in Step S490 or Step S500 only when the driving torque TD and the road surface transmission torque Tdtire are measured relatively accurately, or when it is determined that the absolute value of the driving torque TD is greater than the absolute value of the road surface transmission torque Tdtire in Step S470.

There is a possibility that the driving torque TD coincides with the road surface transmission torque Tdtire, so the torque difference ΔTa is zero. In this case, it can be estimated that the vehicle body vibration is suitably inhibited. In such a case, in the present embodiment, a negative result is provided in the determination in Step S470 (the result of the determination in Step S470 is "NO"), and the processing proceeds to Step S510 for the sake of convenience.

Alternatively, in this case, an affirmative result may be provided in the determination in Step S470 and the processing in Step S490 or Step S500 may be performed, unlike the present embodiment.

The opening degree Vo1 of the air bypass valve 79 is estimated based on the torque difference ΔTa in Step S490 or Step S500. In the estimation processing in Step S490 or Step S500, the torque difference ΔTa is used as a value corresponding to a change with respect to the present opening degree of the air bypass valve 79. Therefore, in the case where the affirmative result is provided in the determination in Step S470 when the torque difference ΔTa is zero unlike the present embodiment, the opening degree Vo1 estimated in Step S490 or Step S500 coincides with the present opening degree.

If the result of the determination in Step S470 is "YES" and the processing proceeds to Step S480, it is determined whether the vehicle is in an accelerating state or in a decelerating state based on the vehicle body acceleration dvd obtained in Step S430. If the vehicle body acceleration dvd is equal to or greater than zero, it is determined that the vehicle is in the accelerating state and the processing proceeds to Step S490. If the vehicle body acceleration dvd is less than 0, it is determined that the vehicle is in the decelerating state and the processing proceeds to Step S500.

In Step S490, the opening degree Vo1 of the air bypass valve 79 for decreasing the driving torque TD is estimated so that the torque difference ΔTa is decreased.

When the vehicle is in the accelerating state, the vehicle body vibration, which raises a front portion of the vehicle body, can be caused. The energy consumed in the vehicle body vibration corresponds to the torque difference ΔTa.

Therefore, in Step S490, the opening degree Vo1 of the air bypass valve 79 for decreasing the driving torque TD of the engine 11 and for decreasing the torque difference ΔTa is estimated. Then, the air bypass valve 79 is controlled so that the opening degree of the air bypass valve 79 coincides with the estimated opening degree Vo1 in the steps from Step S180 to Step S210 of the flowchart shown in FIG. 4. Thus, the vehicle body vibration can be suitably reduced.

If the driving torque TD of the engine 11 is decreased excessively through the control of the opening degree of the air bypass valve 79, the road surface transmission torque Tdtire also decreases. In this case, there is a possibility that the acceleration performance of the vehicle is adversely affected.

Therefore, in Step S490, the opening degree Vo1 of the air bypass valve 79 should be preferably estimated so that the driving torque TD is decreased in a range in which the road surface transmission torque Tdtire does not decrease in accordance with the decrease in the driving torque TD, and so that the torque difference ΔTa is decreased.

The processing in Step S490 may be performed by a following method.

First, a decreasing amount TDdec of the driving torque TD for decreasing the torque difference ΔTa while minimizing the decrease in the road surface transmission torque Tdtire accompanying the decrease in the driving torque TD is defined with the use of a predetermined coefficient α, which is set for each vehicle, based on a following equation (2) in advance.

$$TDdec = \alpha(TD - Tdtire) = \alpha \cdot \Delta Ta, \qquad (2)$$

In Step S490, a change in the opening degree of the air bypass valve 79 corresponding to the decreasing amount TDdec of the driving torque TD is obtained. Then, the summation of the change and the present opening degree of the air bypass valve 79 is calculated as the estimate Vo1 of the opening degree (the opening degree estimate Vo1) of the air bypass valve 79.

In this case, in Step S490, the opening degree estimate Vo1 of the air bypass valve 79 providing the decreasing amount TDdec of the driving torque TD may be obtained based on map data, which are stored in the ROM of the VS-ECU 61 in advance and indicate the relationship between the driving torque TD and the opening degree Vo1 of the air bypass valve 79.

In the case where the processing proceeds to Step S500, the opening degree Vo1 of the air bypass valve 79 for increasing the driving torque TD of the engine 11 is estimated so that the torque difference ΔTa is decreased.

For instance, when the vehicle is in the decelerating state, the vibration (the vehicle body vibration) raising a rear portion of the vehicle body can be caused. The energy consumed in this vehicle body vibration also corresponds to the torque difference ΔTa.

The opening degree Vo1 of the air bypass valve 79 for increasing the driving torque TD of the engine 11 is estimated in Step S500 so that the torque difference ΔTa is decreased. Then, the air bypass valve 79 is controlled in accordance with the estimated opening degree Vo1 in the steps from Step S180 to Step S210 of the flowchart shown in FIG. 4. Thus, the vehicle body vibration can be suitably reduced.

If the driving torque TD of the engine 11 is increased excessively through the control of the opening degree of the air bypass valve 79, the road surface transmission torque Tdtire increases in accordance with the increase in the driving torque TD. In this case, there is a possibility that the deceleration performance of the vehicle is adversely affected.

Therefore, in Step S500, the opening degree Vo1 of the air bypass valve 79 should be preferably estimated so that the driving torque TD is increased in a range in which the road surface transmission torque Tdtire does not increase in accordance with the increase in the driving torque TD, and so that the torque difference ΔTa is decreased.

The processing in Step S500 may be performed with a following method.

First, an increasing amount TDinc of the driving torque TD for decreasing the torque difference ΔTa while minimizing the increase in the road surface transmission torque Tdtire accompanying the increase in the driving torque TD is defined with the use of a predetermined coefficient β, which is set for each vehicle, based on a following equation (3) in advance.

$$TDinc = \beta(TD - Tdtire) = \beta \cdot \Delta Ta, \quad (3)$$

Then, in Step S500, a change in the opening degree of the air bypass valve 79 corresponding to the increasing amount TDinc of the driving torque TD is obtained, and the summation of the change and the present opening degree of the air bypass valve 79 is calculated as the opening degree estimate Vo1 of the air bypass valve 79.

In this case, in Step S500, the opening degree estimate Vo1 of the air bypass valve 79 providing the increasing amount TDinc of the driving torque TD may be obtained based on map data, which are stored in the ROM of the VS-ECU 61 and indicate the relationship between the driving torque and the opening degree of the air bypass valve 79.

If the result of the determination in Step S470 is "NO", the opening degree Vo1 of the air bypass valve 79 necessary to perform traction control for preventing the slip is estimated based on predetermined determination criteria in Step S510. The driving torque TD can become less than the road surface transmission torque Tdtire if the wheel spin of the driving wheels 19RR, 19RL occurs. In such a case, the processing in Step S510 is performed.

If the opening degree estimate Vo1 of the air bypass valve 79 is obtained in Step S490, Step S500 or Step S510, the processing in Step S110 is finished, and the processing proceeds to Step S120 of the flowchart shown in FIG. 4.

In Step S120, it is determined whether the vehicle body speed Vd of the vehicle is in a predetermined stall inhibition speed range, in which stall of the engine 11 can be inhibited.

More specifically, it is determined whether the vehicle body speed Vd (measured in Step S420) is greater than a predetermined stall upper limit speed Va. The upper limit speed Va is an upper limit of the vehicle body speed, below which the stall of the engine 11 can occur.

If the result of the determination in Step S120 is "NO", or if it is determined that the vehicle body speed is not in the stall inhibition speed range in Step S120, the processing proceeds to Step S130.

In Step S130, an opening degree Vo2 of the air bypass valve 79 necessary to prevent the stall of the engine 11 is estimated.

The opening degree Vo2 is estimated based on at least one of the engine cooling fluid temperature and the engine rotation speed inputted from the engine ECU 51 (the engine control component 95). This estimation may be performed based on map data, which are stored in the ROM of the VS-ECU 61 in advance and indicate a relationship between the opening degree Vo2 and at least one of the engine cooling fluid temperature and the engine rotation speed.

Then, in Step S140, the opening degree Vo1 of the air bypass valve 79 obtained in Step S110 for reducing the vehicle body vibration is compared with the opening degree Vo2 of the air bypass valve 79 obtained in Step S130 for preventing the engine stall. More specifically, it is determined whether the opening degree Vo1 is greater than the opening degree Vo2.

If the result of the determination in Step S140 is "YES", the processing proceeds to Step S150. If the result of the determination in Step S140 is "NO", the processing proceeds to Step S160.

In Step S150, the opening degree Vo1 of the air bypass valve 79 obtained in Step S110 for reducing the vehicle body vibration is set as a control command value Vc of the opening degree of the air bypass valve 79. In Step S160, the opening degree Vo2 of the air bypass valve 79 obtained in Step S130 for preventing the stall of the engine 11 is set as the control command value Vc of the opening degree of the air bypass valve 79.

If the result of the determination in Step S120 is "YES", or if it is determined that the vehicle speed Vd is in the stall inhibition speed range in Step S120, the processing proceeds to Step S170.

In Step S170, the opening degree estimate Vo1 obtained in Step S110 for reducing the vehicle body vibration is set as the control command value Vc of the air bypass valve 79.

Thus, if the control command value Vc of the opening degree of the air bypass valve 79 is set in Step S150, Step S160 or Step S170, the processing proceeds to Step S180.

In Step S180, it is determined whether the control command value Vc set in Step S150, Step S160 or Step S170 is greater than a predetermined threshold opening degree K.

If the result of the determination in Step S180 is "YES", the processing proceeds to Step S190.

In Step S190, the control command value Vc set in Step S150, Step S160 or Step S170 is corrected to the threshold opening degree K.

In Step S190, a control command value VoK of the throttle valve 73 is estimated so that the flow rate of the air passing through the intake passage 71 is increased to compensate for a decrease in the flow rate of the air passing through the air bypass passage 77 caused by correcting the control command value Vc to the threshold opening degree K.

The control command value VoK of the opening degree of the throttle valve 73 may be set based on map data, which are stored in the ROM of the VS-ECU 61 in advance.

More specifically, the relationship between the correcting amount of the opening degree of the air bypass valve 79 and the correcting amount of the opening degree of the throttle valve 73 in the case where the change in the flow rate of the air passing through the air bypass passage 77 caused by correcting the opening degree of the air bypass valve 79 is compensated for by correcting the opening degree of the throttle valve 73 is stored in the form of the map data in the ROM of the VS-ECU 61.

Then, the correcting amount of the opening degree of the throttle valve 73 is obtained from the correcting amount of the opening degree of the air bypass valve 79 based on the map data. The correcting amount of the opening degree of the air bypass valve 79 is the difference between the control command value Vc and the threshold opening degree K. Then, the summation of the correcting amount of the opening degree of the throttle valve 73 and the present opening degree of the throttle valve 73 is calculated as the opening degree estimate (the control command value VoK) of the throttle valve 73.

Then, in Step S200, operation guide information for driving the air bypass valve 79 and the throttle valve 73 in accordance with the setting in Step S190 is outputted to the engine ECU 51 (the engine control component 95).

In this case, the engine ECU 51 controls the drive of the actuators 75, 81 based on the operation guide information. Thus, the opening degree of the air bypass valve 79 is controlled to the threshold opening degree K, and the opening degree of the throttle valve 73 is controlled to the control command value VoK in Step S200.

If the result of the determination in Step S180 is "NO", the processing proceeds to Step S210.

In Step S210, the control command value Vc (the opening degree Vo1 or the opening degree Vo2) of the air bypass valve 79 set in Step S150, Step S160 or Step S170 is held. Then, in Step S210, operation guide information for driving the air bypass valve 79 so that the opening degree of the air bypass valve 79 coincides with the held control command value Vc (the opening degree Vo1 or the opening degree Vo2) is outputted to the engine ECU 51.

In this case, the engine ECU 51 controls the actuator 81 based on the operation guide information, and the opening degree of the air bypass valve 79 is controlled to the control command value Vc (the opening degree Vo1 or the opening degree Vo2).

If the processing of Step S200 or Step S210 is performed, the valve control processing is ended once, and the processing is performed from Step S110 again.

As explained above, in the present embodiment, if it is determined that the vehicle body speed Vd is in the stall inhibition speed range (or if the result of the determination in Step S120 is "YES"), the opening degree estimate Vo1 calculated for reducing the vehicle body vibration is set as the control command value Vc of the opening degree of the air bypass valve 79 in Step S170.

In the present embodiment, even in the case where it is determined that the vehicle body speed Vd is not in the stall inhibition speed range, the opening degree Vo1 is set as the control command value Vc of the opening degree of the air bypass valve 79 in Step S150 if it is determined that the opening degree estimate Vo1 for reducing the vehicle body vibration is greater than the opening degree Vo2 for preventing the engine stall in Step S140.

In the present embodiment, if the opening degree estimate Vo1 is set as the control command value Vc of the opening degree of the air bypass valve 79, the drive of the air bypass valve 79 and the like is controlled in accordance with the control command value Vc (Vo1) in the steps from Step S180 to Step S210.

In this case, the vehicle body vibration can be suitably inhibited since the control command value Vc is the value Vo1 estimated in Step S490 or Step S500 for inhibiting the vehicle body vibration.

The opening degree estimate Vo1 is set as the control command value Vc of the opening degree of the air bypass valve 79 when it is determined that the vehicle body speed Vd is in the stall inhibition speed range in Step S120 or if it is determined that the opening degree estimate Vo1 is greater than the opening degree Vo2 in Step S140.

Therefore, in the present embodiment, when the drive of the air bypass valve 79 and the like is controlled in accordance with the opening degree estimate Vo1 set as the command control value Vc, the stall of the engine 11 can also be suitably prevented.

Moreover, in the present embodiment, if it is determined that the vehicle body speed Vd is not in the stall inhibition speed range in Step S120 and it is determined that the opening degree estimate Vo1 for reducing the vehicle body vibration is equal to or less than the opening degree Vo2 for preventing the engine stall in Step S140, the opening degree Vo2 is set as the control command value Vc in Step S160. Thus, the prevention of the engine stall is prioritized over the inhibition of the vehicle body vibration on the ground of safety.

In the present embodiment, when the opening degree Vo2 is set as the control command value Vc of the opening degree of the air bypass valve 79, the drive of the air bypass valve 79 and the like is controlled in accordance with the control command value Vc (Vo2) in the steps from Step S180 to Step S210.

Therefore, in this case, the stall of the engine 11 can be suitably prevented at least.

Moreover, in the present embodiment, if it is determined that the control command value Vc (the opening degree Vo1 or the opening degree Vo2) of the air bypass valve 79 is greater than the threshold opening degree K in Step S180, the control command value Vc is corrected to the threshold opening degree K in Step S190. At that time, the control command value VoK of the opening degree of the throttle valve 73 is set so that the increase in the flow rate of the air passing through the intake air passage 71, in which the throttle valve 73 is disposed, compensates for the decrease in the flow rate of the air passing through the air bypass passage 77 caused by the correction. In this case, the processing for controlling the opening degree of the air bypass valve 79 to the threshold opening degree K and the processing for controlling the opening degree of the throttle valve 73 to the control command value VoK are performed in Step S200.

When the control command value Vc (the opening degree Vo1 or the opening degree Vo2) is relatively great over the threshold opening degree K, it takes a relatively long time to change the quantity of the intake air of the engine 11 by changing the opening degree of the air bypass valve 79 to the opening degree Vo1 or the opening degree Vo2 because of drive speed of the air bypass valve 79. In contrast, in the present embodiment, the opening degree of the air bypass valve 79 is only controlled to the threshold opening degree K. Therefore, the flow rate of the intake air of the engine 11 can be changed in a short time.

Second Embodiment

Next, valve control processing performed by the VS-ECU 61 according to a second embodiment of the present invention will be explained. In the valve control processing according to the second embodiment, only the air bypass valve control amount determination processing (Step S110 of the flowchart of FIG. 4) for reducing the vehicle body vibration is different from that of the first embodiment. Therefore, the air bypass valve control amount determination processing according to the second embodiment will be explained below, based on FIG. 6.

Figure 6:
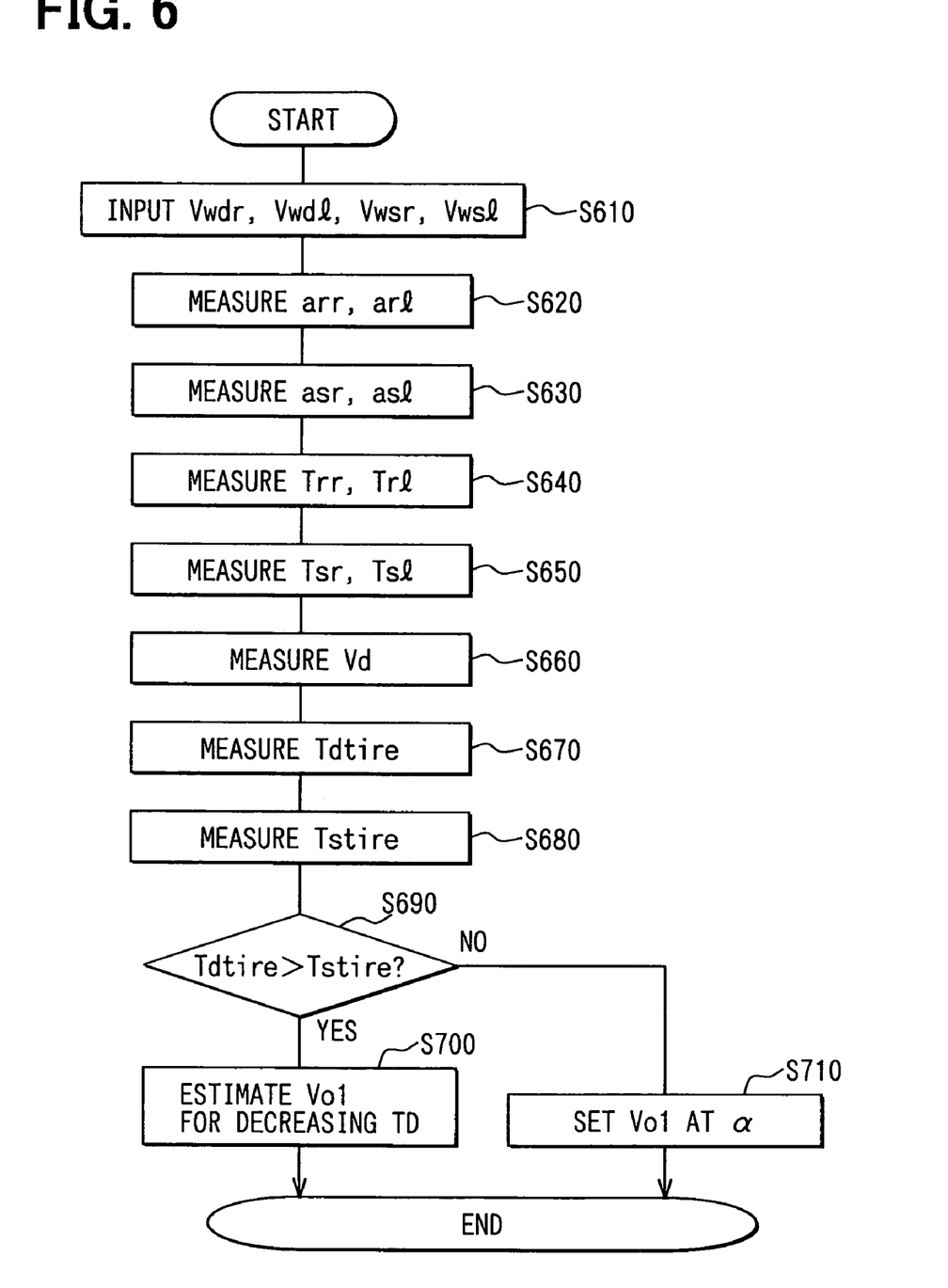
FIG. 6 is a flowchart showing air bypass valve control amount determination processing performed by a vehicle-supervising ECU according to a second embodiment of the present invention.

If the determination processing is started, first, in Step S610, the rotation speed Vwdr of the right driving wheel 19RR, the rotation speed Vwdl of the left driving wheel 19RL, the rotation speed Vwsr of the right front wheel 19FR and the rotation speed Vwsl of the left front wheel 19FL are inputted from the brake ECU 55 (the brake control component 97).

Then, in Step S620, the measured rotation speeds Vwdr, Vwdl of the respective driving wheels 19RR, 19RL are differentiated to measure rotational acceleration arr of the right driving wheel 19RR and rotational acceleration arl of the left driving wheel 19RL. Thus, the rotational accelerations arr, arl of the right and left driving wheels 19RR, 19RL can be calculated in accordance with total drag including air resistance applied to the driving wheels 19RR, 19RL, in addition to the driving force transmitted to the driving wheels 19RR, 19RL in accordance with the driving torque of the engine 11.

In Step S630, the rotation speeds Vwsr, Vwsl of the respective front wheels 19FR, 19FL inputted in Step S610 are differentiated to measure rotational acceleration asr of the right front wheel 19FR and rotational acceleration asl of the left front wheel 19FL. Thus, the rotational accelerations asr, asl of the right and left front wheels 19FR, 19FL can be calculated in accordance with total drag including air resistance applied to the front wheels 19FR, 19FL, in addition to the driving force transmitted from the driving wheels 19RR, 19RL.

Then, in Step S640, values of the torque outputted by the driving wheels 19RR, 19RL, which are driven in accordance with the driving torque outputted from the engine 11 through the AT. 13, are calculated. More specifically, right driving wheel torque Trr outputted by the right driving wheel 19RR and left driving wheel torque Trl outputted by the left driving wheel 19RL are calculated. The right driving wheel torque Trr and the left driving wheel torque Trl are calculated based on following equations (4), (5) using the rotational accelerations arr, arl of the respective driving wheels 19RR, 19RL calculated in Step S620.

$$Trr = Mrr \cdot Rrr \cdot arr, \quad (4)$$

$$Trl = Mrl \cdot Rrl \cdot arl, \quad (5)$$

In the equation (4), Mrr represents a static load of the right driving wheel 19RR, and Rrr is a radius of a tire of the right driving wheel 19RR. In the equation (5), Mrl represents a static load of the left driving wheel 19RL, and Rrl is a radius of a tire of the left driving wheel 19RL. Values stored in the ROM of the VS-ECU 61 are used as the static loads Mrr, Mrl and the radii Rrr, Rrl. Thus, the right driving wheel torque Trr and the left driving wheel torque Trl can be calculated properly when the rotational accelerations arr, arl of the respective driving wheels 19RR, 19RL are obtained. It is because the rotational accelerations arr, arl are calculated in accordance with the total drag applied to the right and left driving wheels 19RR, 19RL in addition to the driving force applied to the right and left driving wheels 19RR, 19RL in accordance with the driving torque of the engine 11.

Then, in Step S650, right front wheel torque Tsr outputted by the right front wheel 19FR and left front wheel torque Tsl outputted by the left front wheel 19FL are calculated based on following equations (6), (7) using the rotational accelerations asr, asl of the respective front wheels 19FR, 19FL obtained in Step S630.

$$Tsr = Msr \cdot Rsr \cdot asr, \quad (6)$$

$$Tsl = Msl \cdot Rsl \cdot asl, \quad (7)$$

In the equation (6), Msr represents a static load of the right front wheel 19FR and Rsr is a radius of a tire of the right front wheel 19FR. In the equation (7), Msl represents a static load of the left front wheel 19FR and Rsl is a radius of a tire of the left front wheel 19FL. Values stored in the ROM of the VS-ECU 61 are used as the static loads Msr, Msl and the radii Rsr, Rsl. Thus, the right front wheel torque Tsr and the left front wheel torque Tsl can be calculated properly when the rotational accelerations asr, asl of the respective front wheels 19FR, 19FL are obtained. It is because the rotational accelerations asr, asl are calculated in accordance with the total drag applied to the right and left front wheels 19FR, 19FL in addition to the driving force applied by the right and left driving wheels 19RR, 19RL.

Then, in Step S660, the vehicle body speed Vd as the traveling speed of the vehicle is measured. For instance, the average of the rotation speeds Vwsr, Vwsl of the front wheels 19FR, 19FL obtained in Step S610 is measured as the vehicle body speed Vd.

Then, in Step S670, driving wheel road surface transmission torque Tdtire transmitted by the driving wheels 19RR, 19RL to the road surface in accordance with the right driving wheel torque Trr and the left driving wheel torque Trl measured in Step S640 is measured.

In this processing, the driving wheel road surface transmission torque Tdtire is calculated based on a following equation (8) using the rotation speeds Vwdr, Vwdl of the driving wheels 19RR, 19RL obtained in Step S610, the right driving wheel torque Trr and the left driving wheel torque Trl obtained in Step S640 and the vehicle body speed vd obtained in Step S660.

$$Td\text{tire} = (Trr \cdot Vwdr + Trl \cdot Vwdl)/Vd, \quad (8)$$

Then, in Step S680, front wheel road surface transmission torque Tstire transmitted by the front wheels 19FR, 19FL to the road surface in accordance with the right front wheel torque Tsr and the left front wheel torque Tsl measured in Step S650 is measured.

In this processing, the front wheel road surface transmission torque Tstire is calculated based on a following equation (9) using the rotation speeds Vwsr, Vwsl of the front wheels 19FR, 19FL obtained in Step S610, the right front wheel torque Tsr and the left front wheel torque Tsl obtained in Step S650 and the vehicle body speed Vd obtained in Step S660.

$$Ts\text{tire} = (Tsr \cdot Vwsr + Tsl \cdot Vwsl)/Vd, \quad (9)$$

Then, in Step S690, the driving wheel road surface transmission torque Tdtire obtained in Step S670 is compared with the front wheel road surface transmission torque Tstire obtained in Step S680. More specifically, it is determined whether the driving wheel road surface transmission torque Tdtire is greater than the front wheel road surface transmission torque Tstire in Step S690.

If the result of the determination in Step S690 is "YES", the processing proceeds to Step S700. If the result of the determination in Step S690 is "NO", the processing proceeds to Step S710.

In the case where the result of the determination in Step S690 is "YES", the processing may proceed to Step S700 after a torque difference ΔTb between the driving wheel road surface transmission torque Tdtire and the front wheel road surface transmission torque Tstire is calculated in Step S690. The torque difference ΔTb may be calculated in Step S700.

In the present embodiment, the vibrating state of the vehicle body can be suitably estimated by comparing the driving wheel road surface transmission torque Tdtire with the front wheel road surface transmission torque Tstire for following reasons.

If the driving forces generated by the driving wheels 19RR, 19RL are transmitted to the front wheels 19FR, 19FL through the road surface in an optimum state, the driving wheel road surface transmission torque Tdtire should coincide with the front wheel road surface transmission torque Tstire.

However, if vibration such as rolling vibration (the motion of the sprung mass) of the vehicle body is caused when the vehicle driver operates the steering wheel and the vehicle body travels in a turning manner, the front wheel road surface transmission torque Tstire can become less than the driving wheel road surface transmission torque Tdtire.

In this case, it can be estimated that the vehicle body vibration (the motion of the sprung mass) is caused by part of the energy corresponding to the difference between the driving wheel road surface transmission torque Tdtire and the front wheel road surface transmission torque Tstire.

Therefore, it can be estimated that the vehicle body vibration (the motion of the sprung mass) accompanying the steering operation is occurring if it is determined that the driving wheel road surface transmission torque Tdtire is greater than the front wheel road surface transmission torque Tstire in Step S690.

Specifically, in the case where the torque difference ΔTb is calculated in the comparison between the torque Tdtire and the torque Tstire when the result of the determination in Step S690 is "YES", the degree of the vehicle body vibration accompanying the steering operation can be evaluated quantitatively. It is because the torque difference ΔTb corresponds to the energy consumed in the vehicle body vibration accompanying the steering operation.

If the result of the determination in Step S690 is "YES" and the processing proceeds to Step S700, the opening degree Vo1 of the air bypass valve 79 for decreasing the driving torque TD outputted from the engine 11 to the drive shaft 15 through the AT 13 is estimated so that the torque difference ΔTb between the torque Tdtire and the torque Tstire is decreased. Thus, the processing in Step S110 is finished.

If the steering operation is performed when the vehicle speed is relatively high, the vehicle vibration such as the rolling vibration with relatively large amplitude is caused. The energy consumed in this kind of vehicle body vibration corresponds to the torque difference ΔTb as explained above.

Therefore, in Step S700, the opening degree Vo1 of the air bypass valve 79 for decreasing the driving torque TD of the engine 11 and for decreasing the torque difference ΔTb is estimated. Then, by controlling the air bypass valve 79 based on the estimated opening degree Vo1 in the steps from Step S180 to Step S210 of the flowchart shown in FIG. 4, the vehicle body vibration accompanying the steering operation can be suitably reduced.

If the driving torque TD of the engine 11 is decreased excessively by controlling the opening degree of the air bypass valve 79, the torque Tdtire and the torque Tstire are decreased greatly in accordance with the decrease in the driving torque TD. In this case, there is a possibility that the traveling performance of the vehicle is adversely affected.

Therefore, in Step S700, the opening degree Vo1 of the air bypass valve 79 should be preferably estimated so that the driving torque TD of the engine 11 is decreased in a range in which the torque Trtire and the torque Tstire are not decreased greatly in accordance with the decrease in the driving torque TD and so that the torque difference ΔTb is decreased.

The processing in Step S700 is performed by a following method, for instance.

First, a decreasing amount TDdec of the driving torque TD for decreasing the torque difference ΔTb while minimizing the decrease in the torque Tdtire and the torque Tstire accompanying the decrease in the driving torque TD is defined with the use of a predetermined coefficient γ, based on a following equation (10). The coefficient γ is set for each vehicle in advance.

$$TDdec = \gamma(Tdtire - Tstire) = \gamma \cdot \Delta Tb, \quad (10)$$

In Step S700, the change of the opening degree of the air bypass valve 79 corresponding to the driving torque decreasing amount TDdec is obtained and the summation of the change and the present opening degree of the air bypass valve 79 is calculated as the estimate Vo1 of the opening degree of the air bypass valve 79 (the opening degree estimate Vo1).

In this case, in Step S700, the opening degree estimate Vo1 of the air bypass valve 79 for providing the driving torque decreasing amount TDdec may be obtained based on map data, which are stored in the ROM of the VS-ECU 61 in advance and indicate the relationship between the driving torque and the opening degree of the air bypass valve 79.

If the result of the determination in Step S690 is "NO" and the processing proceeds to Step S710, the opening degree estimate Vo1 is set at a predetermined value α, which is set based on predetermined determination criteria. Thus, the processing in Step S110 is finished.

In Step S710, the opening degree estimate Vo1 may be set at the present opening degree of the air bypass valve 79.

Also in the case where the opening degree estimate Vo1 is set at the present opening degree of the air bypass valve 79 in Step S710 and the air bypass valve 79 is controlled in accordance with the opening degree estimate Vo1 in the steps from Step S180 to Step S210 of the flowchart shown in FIG. 4, the vehicle body vibration accompanying the steering operation can be suitably inhibited for following reasons.

The processing in Step S710 is also performed when the torque difference ΔTb between the torque Tdtire and the torque Tstire is zero and the result of the determination in Step S690 is "NO".

The torque difference ΔTb becomes zero when the driving forces generated by the driving wheels 19RR, 19RL are transmitted to the front wheels 19FR, 19FL through the road surface in an optimum state. Since the torque difference ΔTb is zero, it can be estimated that the vehicle body vibration, which is caused by the energy corresponding to the torque difference ΔTb and accompanies the steering operation, is suitably inhibited.

Therefore, in this case, it is estimated that the vehicle body vibration accompanying the steering operation can be suitably inhibited by holding the opening degree of the air bypass valve 79 at the present value.

Therefore, in this case, the vehicle body vibration accompanying the steering operation can be suitably inhibited by setting the opening degree estimate Vo1 of the air bypass valve 79 at the present value in Step S710 and by controlling the air bypass valve 79 based on the opening degree estimate Vo1 in the steps from Step S180 to Step S210.

Alternatively, the determination in Step S690 may be determined affirmatively and the estimation processing in Step S700 may be performed when the torque difference ΔTb is zero. Also in this case, the similar effect can be achieved for following reasons.

The torque difference ΔTb is used as a value corresponding to the change with respect to the present opening degree of the air bypass valve 79 in the estimation processing of Step S700.

Therefore, unlike the present embodiment, if the affirmative result is provided in the determination in Step S690 (or if the result of the determination in Step S690 is "YES") when the torque difference ΔTb is zero, the opening degree Vo1 of the air bypass valve 79 estimated in Step S700 coincides with the present opening degree.

The result in this case coincides with the result in the case where the negative result is provided in the determination in Step S690 (or the result of the determination in Step S690 is "NO") when the torque difference ΔTb is zero and the opening degree estimate Vo1 is set at the present opening degree of the air bypass valve 79 in Step S710.

Therefore, the vehicle body vibration accompanying the steering operation can be suitably inhibited also in the case where the affirmative result is provided in the determination in Step S690 when the torque difference ΔTb is zero and the air bypass valve 79 is controlled in the steps from Step S180 to Step S210 in accordance with the opening degree Vo1 estimated in Step S700.

The processing in Step S710 is also performed when the torque Tstire is greater than the torque Tdtire and the result of the determination in Step S690 is "NO".

The torque Tstire becomes greater than the torque Tdtire when the driving forces generated by the driving wheels 19RR, 19RL are transmitted to the front wheels 19FR, 19FL through the road surface in the optimum state and external factors are applied to the front wheels 19FR, 19FL to further increase the driving forces of the front wheels 19FR, 19FL, for instance.

This state is formed when the front wheels 19FR, 19FL are placed on a descending slope continuing from an ascending slope and the driving wheels (the rear wheels) 19RR, 19RL are placed on the ascending slope after the vehicle travels on the ascending slope, for instance. In this case, the driving forces of the driving wheels 19RR, 19RL are transmitted to the front wheels 19FR, 19FL through the road surface, and driving forces (the external factors) caused when the vehicle reaches the descending slope are additionally applied to the front wheels 19FR, 19FL.

In this case, the driving forces of the driving wheels 19RR, 19RL are transmitted to the front wheels 19FR, 19FL in the optimum state. Therefore, it can be estimated that the vehicle body vibration (the motion of the sprung mass) due to the steering operation is suitably inhibited.

Therefore, in this case, it is estimated that the vehicle body vibration accompanying the steering operation can be suitably inhibited by holding the opening degree of the air bypass valve 79 at the present opening degree.

Therefore, also in this case, by setting the opening degree estimate Vo1 of the air bypass valve 79 at the present opening degree in Step S710 and by controlling the air bypass valve 79 in the steps from Step S180 to Step S210 in accordance with the opening degree estimate Vo1, the vehicle body vibration accompanying the steering operation can be suitably inhibited.

(Modifications)

In the first and second embodiments, the opening degree of the air bypass valve 79 or the opening degree of the throttle valve 73 is regulated to control the driving torque TD outputted from the engine 11.

However, if it takes a relatively long time to change the driving torque outputted from the engine 11 to a desired state by just regulating the opening degree, various types of other processing may be performed collaterally in Step S200 or Step S210.

The various types of other processing should be preferably determined and performed based on information inputted from the ECUs 51, 53, 55, 57, 59 (the components 91, 93, 95, 97, 99) to the VS-ECU 61, the torque difference (the torque difference ΔTa or the torque difference ΔTb) and a predetermined priority among the candidates of the other processing.

As one of the various types of other processing for decreasing the driving torque TD, processing for outputting operation guide information for increasing an output of the alternator 33 in accordance with the state of the battery 31 to the engine ECU 51 (the engine control component 95) may be performed, if the operation state information that the alternator 33 is generating no or relatively little electricity is inputted from the engine ECU 51.

Alternatively, operation guide information for increasing the output of the air conditioner 35 may be outputted to the AC-ECU 59 (the AC control component 99) if operation state information that the air conditioner 35 is operating is inputted from the AC-ECU 59.

Alternatively, operation guide information for increasing the braking forces of the brake devices 21FL–21RR applied to the respective wheels 19FL–19RR may be outputted to the brake ECU 55 (the brake control component 97).

The load applied to the engine 11 is increased and the driving torque TD outputted from the engine 11 is decreased by operating at least one of the alternator 33, the air conditioner 35 and the brake devices 21FL–21RR based on the outputted operation guide information.

As one of the various types of other processing for increasing the diving torque TD of the engine 11, processing for outputting operation guide information for decreasing the output of the alternator 33 to the engine ECU 51 may be performed if operation state information that the alternator 33 is generating the electricity is inputted from the engine ECU 51.

Alternatively, operation guide information for decreasing the output of the air conditioner 35 may be outputted to the AC-ECU 59 (the AC control component 99) if operation state information that the air conditioner 35 is operating is inputted from the AC-ECU 59.

Thus, the load applied to the engine 11 is decreased and the driving torque TD outputted from the engine 11 is increased by operating at least one of the alternator 33 and the air conditioner 35 based on the outputted operation guide information.

In the first and second embodiments, the multi-speed transmission is employed as the AT 13. Alternatively, a continuously variable transmission (CVT) may be employed as the AT 13.

In this case, by continuously changing the change gear ratio of the CVT, smooth changing control of the driving torque TD outputted by the engine 11 can be performed. Therefore, processing for outputting operation guide information for changing the change gear ratio of the CVT to the AT-ECU 53 may be performed collaterally in Step S200 or Step S210 as one of the various types of other processing.

More specifically, the driving torque TD of the engine 11 may be decreased or increased by outputting operation guide information for decreasing the change gear ratio of the CVT (to a higher speed ratio) or for increasing the change gear ratio (to a lower speed ratio).

In the first and second embodiments, the system may be structured so that the fuel injection quantity is increased with respect to the air intake quantity if the opening degree of the air bypass valve 79 or the throttle valve 73 is increased from the present opening degree to increase the driving torque TD of the engine 11. Thus, the driving torque TD of the engine 11 is suitably increased immediately after the opening degree is increased.

In this case, in order to increase the fuel injection quantity, an additional fuel injection valve 87 may be disposed in the intake passage 71 upstream of the intake manifold 83 in addition to fuel injection valves 85 mounted in the respective cylinders as shown in FIG. 2.

In this case, processing for injecting a predetermined quantity of the fuel from the additional fuel injection valve 87 is performed at substantially the same time when the processing for increasing the opening degree of the air bypass valve 79 or the throttle valve 73 from the present opening degree is performed. Thus, the driving torque TD of the engine 11 can be suitably increased immediately after the opening degree of the air bypass valve 79 or the throttle valve 73 is increased.

In the first and second embodiments, the present invention is applied to the front engine rear drive vehicle. The present invention can also be applied to other types of vehicles.

For instance, a front engine front drive vehicle, a rear engine rear drive vehicle, a midship engine rear drive vehicle or any other type of vehicle can be employed in the first embodiment. Also in this case, an effect similar to the effect of the first embodiment can be achieved. Any type of vehicle (for instance, the rear engine rear drive vehicle or the midship engine rear drive vehicle) can be employed in the second embodiment as long as the vehicle is a rear wheel drive vehicle. Also in this case, an effect similar to the effect of the second embodiment can be achieved.

In the first and second embodiments, the hardware of the ECU is divided into the engine ECU 51, the AT-ECU 53, the brake ECU 55, the steering ECU 57, the AC-ECU 59, and the VS-ECU 61. Alternatively, other structure of the ECU may be employed.

The same vehicle body speed Vd is used in the calculation of the torque Tdtire and the torque Tstire in Step S670 and Step S680 of the second embodiment. Alternatively, the vehicle body speed Vd may not be used in the calculation of the torque Tdtire and the torque Tstire.

More specifically, in Step S670, a driving wheel road surface transmission torque corresponding amount Tdc corresponding to the driving wheel road surface transmission torque Tdtire may be calculated based on a following equation (11).

$$Tdc = Trr \cdot Vwdr + Trl \cdot Vwdl (= Vd \cdot Tdtire), \quad (11)$$

In Step S680, a front wheel road surface transmission torque corresponding amount Tsc corresponding to the front wheel road surface transmission torque Tstire may be calculated based on a following equation (12).

$$Tsc = Tsr \cdot Vwsr + Tsl \cdot Vwsl (= Vd \cdot Tstire), \quad (12)$$

In this case, the driving wheel road surface transmission torque corresponding amount Tdc is compared with the front wheel road surface transmission torque corresponding amount Tsc in Step S690. In Step S700, the opening degree Vo1 of the air bypass valve 79 for decreasing the driving torque TD of the engine 11 is estimated so that a difference ΔTc between the driving wheel road surface transmission torque corresponding amount Tdc and the front wheel road surface transmission torque corresponding amount Tsc is decreased. Also in this case, the vehicle body vibration accompanying the steering operation can be suitably reduced by controlling the air bypass valve 79 in accordance with the opening degree estimate Vo1 in the steps from Step S180 to Step S210 like the second embodiment.

In this case, the processing can be performed without using the vehicle body speed Vd. Accordingly, the processing can be simplified by omitting the processing in Step S660 of the second embodiment.

The programs for making the computer (the microcomputer) perform the valve control processing shown in FIG. 4 and the air bypass valve control amount determination processing shown in FIG. 5 or FIG. 6 can be stored in a memory device such as a flexible disk, a magnetic optical disk, CD-ROM, a hard disk, ROM, and RAM, from which the computer can read the programs. Thus, the programs can be loaded into computer, and the computer can start the programs to use, when necessary. The programs can be also loaded into the computer through a network. Thus, the computer can start the programs to use, when necessary.

The present invention should not be limited to the disclosed embodiments, but may be implemented in many other ways without departing from the spirit of the invention.

What is claimed is:

1. An internal combustion engine control system for controlling an operating state of an internal combustion engine of a vehicle by controlling an air bypass valve, which is disposed in an air bypass passage for regulating a flow rate of air passing through the air bypass passage formed in an air intake passage of the engine so that the air bypass passage bypasses a throttle valve disposed in the air intake passage, the control system comprising:

vibration estimating means for estimating a state of vibration of a vehicle body of the vehicle while the vehicle is traveling; and vibration inhibition opening degree estimating means for estimating an opening degree of the air bypass valve necessary to inhibit the vibration of the vehicle body based on the estimated state of the vibration of the vehicle body.

2. An internal combustion engine control system for controlling an operating state of an internal combustion engine of a vehicle by controlling an air bypass valve, which is disposed in an air bypass passage for regulating a flow rate of air passing through the air bypass passage formed in an air intake passage of the engine so that the air bypass passage bypasses a throttle valve disposed in the air intake passage, the control system comprising:

vibration estimating means for estimating a state of vibration of a vehicle body of the vehicle; and vibration inhibition opening degree estimating means for estimating an opening degree of the air bypass valve necessary to inhibit the vibration of the vehicle body based on the estimated state of the vibration of the vehicle body, wherein the vibration estimating means includes:

driving torque measuring means for measuring driving torque outputted from the engine to a drive shaft;

transmission torque measuring means for measuring road surface transmission torque transmitted from driving wheels, which are driven by the driving torque transmitted from the drive shaft, to a road surface; and first comparing means for comparing the driving torque with the road surface transmission torque.

3. The control system as in claim 2, further comprising:

driving wheel rotation speed measuring means for measuring rotation speeds of the driving wheels of the vehicle respectively;

driving wheel torque measuring means for measuring values of driving wheel torque outputted from the driving wheels respectively; and vehicle body speed measuring means for measuring vehicle body speed of the vehicle, wherein the transmission torque measuring means estimates the road surface transmission torque by calculating the following equation:

$$Td\text{tire} = (Tdr \cdot Vwdr + Tdl \cdot Vwdl)/Vd,$$

where Tdtire is the road surface transmission torque, Tdr is the driving wheel torque of a right driving wheel, Vwdr is the rotation speed of the right driving wheel, Tdl is the driving wheel torque of a left driving wheel, Vwdl is the rotation speed of the left driving wheel, and Vd is the vehicle body speed of the vehicle.

4. The control system as in claim 3, further comprising:
driven wheel rotation speed measuring means for measuring rotation speeds of driven wheels of the vehicle respectively, wherein
the vehicle body speed measuring means measures an average of the rotation speeds of the respective driven wheels measured by the driven wheel rotation speed measuring means as the vehicle body speed.

5. The control system as in claim 2, further comprising:
output torque measuring means for measuring output torque of the engine; and
change gear ratio measuring means for measuring a change gear ratio of a transmission, through which the driving torque is transmitted from the engine to the drive shaft, wherein
the driving torque measuring means estimates the driving torque outputted to the drive shaft based on the output torque and the change gear ratio.

6. The control system as in claim 2, wherein
the vibration inhibition opening degree estimating means estimates the opening degree of the air bypass valve for decreasing a difference between the driving torque and the road surface transmission torque.

7. The control system as in claim 6, wherein
the vibration inhibition opening degree estimating means estimates the opening degree of the air bypass valve for decreasing the difference between the driving torque and the road surface transmission torque if the first comparing means determines that an absolute value of the driving torque is greater than an absolute value of the road surface transmission torque.

8. The control system as in claim 6, wherein
the vibration inhibition opening degree estimating means measures acceleration of the vehicle body of the vehicle and estimates the opening degree of the air bypass valve based on the vehicle body acceleration.

9. The control system as in claim 8, wherein
the vibration inhibition opening degree estimating means determines whether the vehicle is in an accelerating state or in a decelerating state based on the vehicle body acceleration,
the vibration inhibition opening degree estimating means estimates the opening degree of the air bypass valve for decreasing the driving torque outputted by the engine so that the difference between the driving torque and the road surface transmission torque is decreased if the vibration inhibition opening degree estimating means determines that the vehicle is in the accelerating state, and
the vibration inhibition opening degree estimating means estimates the opening degree of the air bypass valve for increasing the driving torque outputted by the engine so that the difference between the driving torque and the road surface transmission torque is decreased if the vibration inhibition opening degree estimating means determines that the vehicle is in the decelerating state.

10. An internal combustion engine control system for controlling an operating state of an internal combustion engine of a vehicle by controlling an air bypass valve, which is disposed in an air bypass passage for regulating a flow rate of air passing through the air bypass passage formed in an air intake passage of the engine so that the air bypass passage bypasses a throttle valve disposed in the air intake passage, the control system comprising:
vibration estimating means for estimating a state of vibration of a vehicle body of the vehicle; and
vibration inhibition opening degree estimating means for estimating an opening degree of the air bypass valve necessary to inhibit the vibration of the vehicle body based on the estimated state of the vibration of the vehicle body,
wherein the vehicle is a rear wheel drive vehicle, and
the vibration estimating means includes:
driving wheel transmission torque measuring means for measuring driving wheel road surface transmission torque transmitted from rear wheels as driving wheels of the vehicle to a road surface in accordance with driving torque outputted by the engine;
front wheel transmission torque measuring means for measuring front wheel road surface transmission torque transmitted from front wheels as driven wheels of the vehicle to the road surface; and
second comparing means for comparing the driving wheel road surface transmission torque with the front wheel road surface transmission torque.

11. The control system as in claim 10, further comprising:
front wheel rotation speed measuring means for measuring rotation speeds of the front wheels respectively;
front wheel torque measuring means for measuring values of front wheel torque outputted from the front wheels respectively; and
vehicle body speed measuring means for measuring speed of a vehicle body of the vehicle, wherein
the front wheel transmission torque measuring means estimates the front wheel road surface transmission torque by calculating the following equation:

$$Tstire=(Tsr \cdot Vwsr+Tsl \cdot Vwsl)/Vd,$$

where Tstire is the front wheel road surface transmission torque, Tsr is the front wheel torque of a right front wheel, Vwsr is the rotation speed of the right front wheel, Tsl is the front wheel torque of a left front wheel, Vwsl is the rotation speed of the left front wheel, and Vd is the vehicle body speed of the vehicle.

12. The control system as in claim 11, further comprising:
front wheel acceleration measuring means for measuring rotational accelerations of the front wheels of the vehicle respectively, wherein
the front wheel torque measuring means estimates the front wheel torque of the right front wheel by calculating the following equation:

$$Tsr=Msr \cdot Rsr \cdot asr,$$

where Tsr represents the front wheel torque of the right front wheel, Msr is a predetermined static load of the right front wheel, Rsr is a predetermined radius of a tire of the right front wheel, and asr is the rotational acceleration of the right front wheel, and
the front wheel torque measuring means estimates the front wheel torque of the left front wheel by calculating the following equation:

$$Tsl=Msl \cdot Rsl \cdot asl,$$

where Tsl represents the front wheel torque of the left front wheel, Msl is a predetermined static load of the left front wheel, Rsl is a predetermined radius of a tire of the left front wheel, and asl is the rotational acceleration of the left front wheel.

13. The control system as in claim 12, wherein
the front wheel acceleration measuring means calculates the rotational accelerations of the respective front wheels of the vehicle by differentiating the rotation speeds of the respective front wheels measured by the front wheel rotation speed measuring means.

14. The control system as in claim 11, wherein
the vehicle body speed measuring means measures an average of the rotation speeds of the front wheels as the vehicle body speed.

15. The control system as in claim 11, further comprising:
driving wheel rotation speed measuring means for measuring rotation speeds of the driving wheels of the vehicle respectively; and
driving wheel torque measuring means for measuring values of driving wheel torque outputted by the driving wheels respectively, wherein
the driving wheel transmission torque measuring means estimates the driving wheel road surface transmission torque by calculating the following equation:

$$Tdtire=(Trr \cdot Vwdr+Trl \cdot Vwdl)/Vd,$$

where Tdtire represents the driving wheel road surface transmission torque, Trr is the driving wheel torque of a right driving wheel, Vwdr is the rotation speed of the right driving wheel, Trl is the driving wheel torque of a left driving wheel, Vwdl is the rotation speed of the left driving wheel, and Vd is the vehicle body speed of the vehicle.

16. The control system as in claim 15, further comprising:
driving wheel acceleration measuring means for measuring rotational accelerations of the driving wheels of the vehicle respectively, wherein
the driving wheel torque measuring means estimates the driving wheel torque of the right driving wheel by calculating the following equation:

$$Trr=Mrr \cdot Rrr \cdot arr,$$

where Tm represents the driving wheel torque of the right driving wheel, Mrr is a predetermined static load of the right driving wheel, Rrr is a predetermined radius of a tire of the right driving wheel, and arr is the rotational acceleration of the right driving wheel, and
the driving wheel torque measuring means estimates the driving wheel torque of the left driving wheel by calculating the following equation:

$$Trl=Mrl \cdot Rrl \cdot arl,$$

where Trl represents the driving wheel torque of the left driving wheel, Mrl is a predetermined static load of the left driving wheel, Rrl is a predetermined radius of a tire of the left driving wheel, and arl is the rotational acceleration of the left driving wheel.

17. The control system as in claim 16, wherein
the driving wheel acceleration measuring means calculates the rotational accelerations of the respective driving wheels of the vehicle by differentiating the rotation speeds of the respective driving wheels measured by the driving wheel rotation speed measuring means.

18. The control system as in claim 10, wherein
the vibration inhibition opening degree estimating means estimates the opening degree of the air bypass valve for decreasing the difference between the driving wheel road surface transmission torque and the front wheel road surface transmission torque.

19. The control system as in claim 18, wherein
the vibration inhibition opening degree estimating means estimates the opening degree of the air bypass valve for decreasing the difference between the driving wheel road surface transmission torque and the front wheel road surface transmission torque if the second comparing means determines that the driving wheel road surface transmission torque is greater than the front wheel road surface transmission torque.

20. The control system as in claim 18, wherein
the vibration inhibition opening degree estimating means estimates the opening degree of the air bypass valve for decreasing the driving torque outputted by the engine so that the difference between the driving wheel road surface transmission torque and the front wheel road surface transmission torque is decreased.

21. An internal combustion engine control system for controlling an operating state of an internal combustion engine of a vehicle by controlling an air bypass valve, which is disposed in an air bypass passage for regulating a flow rate of air passing through the air bypass passage formed in an air intake passage of the engine so that the air bypass passage bypasses a throttle valve disposed in the air intake passage, the control system comprising:
vibration estimating means for estimating a state of vibration of a vehicle body of the vehicle;
vibration inhibition opening degree estimating means for estimating an opening degree of the air bypass valve necessary to inhibit the vibration of the vehicle body based on the estimated state of the vibration of the vehicle body;
stall prevention opening degree estimating means for estimating the opening degree of the air bypass valve necessary to prevent stall of the engine; and
first setting means for comparing the opening degree estimated by the vibration inhibition opening degree estimating means with the opening degree estimated by the stall prevention opening degree estimating means, wherein
the first setting means sets the opening degree estimated by the vibration inhibition opening degree estimating means as a control command value of the opening degree of the air bypass valve if the first setting means determines that the opening degree estimated by the vibration inhibition opening degree estimating means is greater than the opening degree estimated by the stall prevention opening degree estimating means, and
the first setting means sets the opening degree estimated by the stall prevention opening degree estimating means as the control command value of the opening degree of the air bypass valve if the first setting means determines that the opening degree estimated by the vibration inhibition opening degree estimating means is equal to or less than the opening degree estimated by the stall prevention opening degree estimating means.

22. The control system as in claim 21, further comprising:
vehicle speed determining means for determining whether vehicle body speed of the vehicle is in a predetermined stall inhibition speed range, in which the stall of the engine is inhibited; and
second setting means for setting the opening degree estimated by the vibration inhibition opening degree estimating means as the control command value of the opening degree of the air bypass valve if the vehicle speed determining means determines that the vehicle body speed is in the stall inhibition speed range.

23. The control system as in claim 22, wherein
the stall prevention opening degree estimating means estimates the opening degree of the air bypass valve and the first setting means sets the control command value of the opening degree of the air bypass valve if the vehicle speed determining means determines that the vehicle body speed is not in the stall inhibition speed range.

24. The control system as in claim 22, further comprising:

a computer programmed to function as the vibration estimating means, the vibration inhibition opening degree estimating means, the stall prevention opening degree estimating means, the first setting means, the vehicle speed determining means and the second setting means.

25. The control system as in claim 21, further comprising:

correcting means for determining whether the opening degree of the air bypass valve set as the control command value is greater than a predetermined threshold opening degree, wherein the correcting means corrects the control command value to the threshold opening degree and sets a control command value of an opening degree of the throttle valve so that a flow rate of air passing through the air intake passage is increased to compensate for a decrease in the flow rate of the air passing through the air bypass passage, which is caused by correcting the opening degree of the air bypass valve, if the correcting means determines that the opening degree of the air bypass valve set as the control command value is greater than the threshold opening degree.

26. The control system as in claim 25, wherein the correcting means holds the control command value of the opening degree of the air bypass valve at a present value if the correcting means determines that the opening degree of the air bypass valve set as the control command control value is equal to or less than the threshold opening degree.

27. The control system as in claim 25, further comprising:

a computer programmed to function as the vibration estimating means, the vibration inhibition opening degree estimating means, the stall prevention opening degree estimating means, the first setting means and the correcting means.

28. The control system as in claim 21, further comprising:

a computer programmed to function as the vibration estimating means, the vibration inhibition opening degree estimating means, the stall prevention opening degree estimating means and the first setting means.

29. An internal combustion engine control system for controlling an operating state of an internal combustion engine of a vehicle by controlling an air bypass valve, which is disposed in an air bypass passage for regulating a flow rate of air passing through the air bypass passage formed in an air intake passage of the engine so that the air bypass passage bypasses a throttle valve disposed in the air intake passage, the control system comprising:

vibration estimating means for estimating a state of vibration of a vehicle body of the vehicle;

vibration inhibition opening degree estimating means for estimating an opening degree of the air bypass valve necessary to inhibit the vibration of the vehicle body based on the estimated state of the vibration of the vehicle body; and a computer programmed to function as the vibration estimating means.

30. An internal combustion engine control system for controlling an operating state of an internal combustion engine of a vehicle by controlling an air bypass valve, which is disposed in an air bypass passage for regulating a flow rate of air passing through the air bypass passage formed in an air intake passage of the engine so that the air bypass passage bypasses a throttle valve disposed in the air intake passage, the control system comprising:

vibration estimating means for estimating a state of vibration of a vehicle body of the vehicle;

vibration inhibition opening degree estimating means for estimating an opening degree of the air bypass valve necessary to inhibit the vibration of the vehicle body based on the estimated state of the vibration of the vehicle body; and a computer programmed to function as the vibration inhibition opening degree estimating means.

* * * * *